Nov. 2, 1948.  C. GUIDRY  2,452,850
DUMP BODY FOR TRUCKS

Filed April 22, 1946  2 Sheets-Sheet 1

Inventor
Clans Guidry.

By Clarence A. O'Brien
and Harvey B. Jacobson
Attorneys

Nov. 2, 1948.  C. GUIDRY  2,452,850
DUMP BODY FOR TRUCKS
Filed April 22, 1946  2 Sheets-Sheet 2

Inventor
Clans Guidry.

By Clarence A. O'Brien
and Harvey B. Jacobson
Attorneys

Patented Nov. 2, 1948

2,452,850

UNITED STATES PATENT OFFICE 2,452,850

DUMP BODY FOR TRUCKS

Clans Guidry, Jennings, La.

Application April 22, 1946, Serial No. 663,996

1 Claim. (Cl. 298—19)

This invention relates to improvements in dump bodies for trucks.

An object of the invention is to provide an improved dump body for trucks which will be pivotally supported upon a transverse pivot across the truck chassis, together with a manually operated hoist for elevating the forward end of the truck body to dump the load when desired.

Another object of the invention is to provide an improved dump body for trucks which will be formed with a reinforced depending bracket at its forward end, the same being connected with a cable which will be operated in connection with a hand winch mounted upon the truck chassis, and means at the rear end of said dump body for positively locking the tail gate thereof.

A further object of the invention is to provide an improved automobile truck dump body which will be mounted for elevating the forward end thereof, said mounting including a transverse pivot supported adjacent the rear end of the truck chassis and at a point nearer to the back of said dump body than to the forward end thereof, whereby when said body has been elevated at its forward end and its load has been dumped, the forward end of said truck being heavier than the rear end, will automatically drop back to its level position due to the forces of gravity.

Another object of the invention is to provide an improved dump body for automobile trucks which will be highly efficient in operation and relatively inexpensive to manufacture and produce.

Other objects will appear as the description proceeds.

In the accompanying drawings which form a part of this application,

Like characters of reference are used throughout the following specification and the accompanying drawings to designate corresponding parts.

Figure 1:
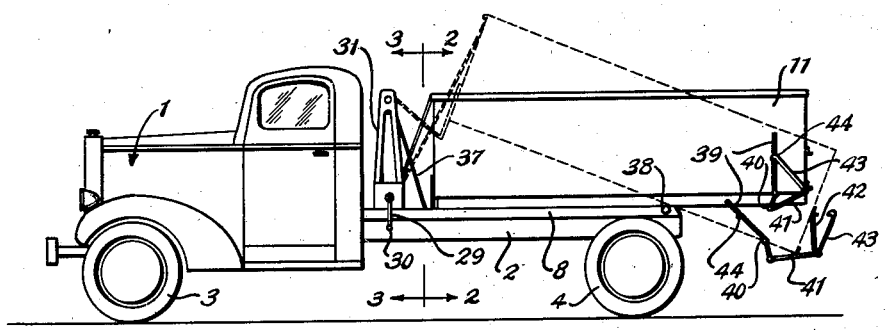
Figure 1 is a side elevation of the improved dump body shown in position upon an automobile truck and shown in dotted lines as it appears when in elevated position.
Figure 2:
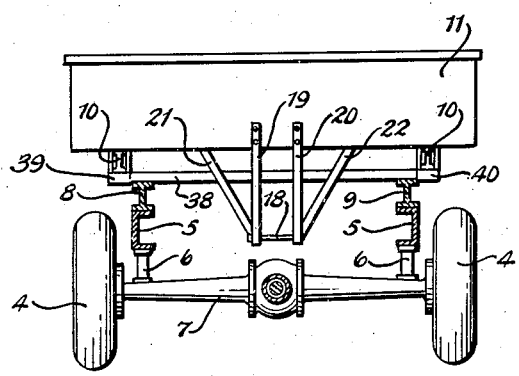
Figure 2 is a view taken on a line 2—2 of Figure 1.
Figure 3:
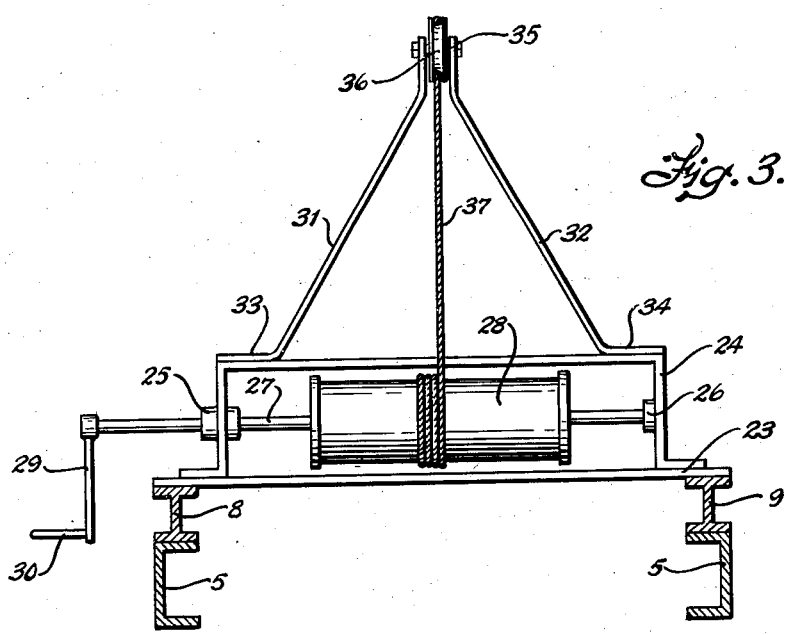
Figure 3 is a view taken on a line 3—3 of Figure 1.
Figure 4:
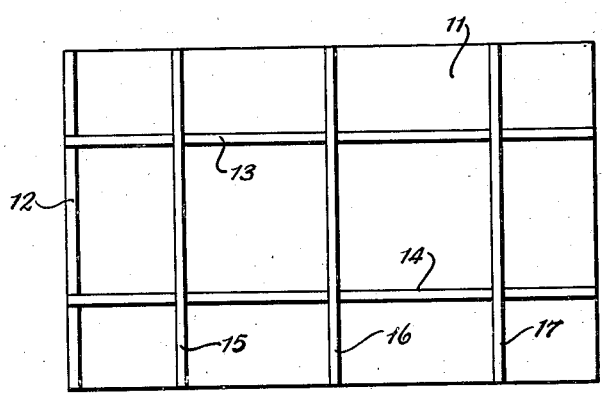
Figure 4 is a bottom plan view of the dump body showing the bracing means therefor.

In carrying out the invention, there is provided an improved automobile truck designated by the reference numeral 1, the same being provided with a chassis 2 and front wheels 3, and rear wheels 4.

The chassis will include the oppositely disposed U-shape channel beams 5 which are mounted on their sides, and are supported by the springs 6 and the gear housing 7 with wheels 8 at the rear end, and by the front wheels 3 at its forward end.

To gain height for the dump body, there is provided the longitudinally extending I-beams 8 and 9 which are preferably welded to the U-beams 5, and support the four inch longitudinally disposed I-beams 10, which are welded to the metal bottom of the dump body 11 to reinforce the same.

The bottom of the dump body 11 is provided with a transversely extending forward bracing member 12 which is welded to the spaced forwardly extending longitudinal bracing elements 13 and 14, which in turn are reinforced by the spaced transversely extending members 15, 16 and 17, the same being welded to the longitudinally extending members 13 and 14 to provide a thoroughly reinforced bottom for the wagon body 11. The wagon body 11 will comprise opposite sides with interconnected front and rear portions, the same being formed as a single unit and welded together and to the said I-beams 10 as hereinbefore described.

Secured to the forward end of the body 11 and depending therefrom is the transversely extending pedestal lifting bar 18 which is supported and reinforced by the spaced bracing members 19 and 20 secured to the forward end of the truck body 11, and by the laterally extending bracing members 21 and 22 connected to the underneath surface of the said truck body.

The supporting plate 23 will be mounted transversely across the I-beams 8 and 9 and secured thereto by welding, and will support the steel hoist housing 24, which will be provided with the aligned bearings 25 and 26 in its opposite ends, said bearings being adapted to support the rotatable shaft 27, which in turn supports the hoist drum 28, which is fixed thereto. A suitable crank 29 having a handle 30 will be secured to the lateral extension of the shaft 27 whereby rotation of said crank will cause a like rotation of the hoist drum 28. A triangular shaped sheave supporting frame comprising the oppositely disposed side members 31 and 32 which are secured at their lower ends by means of the lateral extensions 33 and 34 will be welded to the upper surface of the housing 24, and will be arranged in parallel relation at their upper ends, and will be suitably apertured to receive the bolt or shaft 35 upon which the sheave or pulley 36 will be mounted for rotation.

A cable 37 will be secured to the hoist drum 28 and several turns will be wound thereabout after which the cable will be passed over the sheave 36 and will be passed downwardly to be engaged and secured on the cross hoist arm or bracket 18 supported at the forward end of said dump body and depending therebelow, whereby the forward end of said dump body may be elevated when said crank 29 is rotated. The cable 37 will be also connected between the upper edge of the front of the dump body and to the drum, whereby the body may be positively lowered by rotating the drum in the reverse direction to the direction to which it is rotated for raising the dump body.

A transversely disposed pivot rod or bar 38 will be mounted transversely of the I-beams 8 and 9, and will be secured thereto to extend outwardly from the opposite side thereof. Suitable bearing collars 39 and 40 will be welded to the I-beams 10 immediately below the same and will be adapted to be supported upon the opposite ends of the pivot bar 38, to act as a hinge for the dump body 11. The pivot bar 38 will be mounted adjacent the rear of the chassis 2, at a point nearer the rear end of the dump body than the forward end thereof, whereby when the driver of the truck gets out of his truck and rotates the crank 29, the hoist drum 28 will wind in on the cable 37 to pull upwardly on the forward end of the dump body to elevate the same, as shown in dotted lines in Figure 1 of the drawings. The bell-crank lever operating handle 39 will be pivoted at 40 at the side of the dump body at its rear end and will be connected to a lever 41 pivotally supported to the lower edge of the tail gate 42, and a latch member 43 will be adapted to hook over a lug 44 on the handle 39 to lock the tail gate 42 when in closed position. The tail gate may be unlatched when the load is to be dumped from the truck body, and when the truck body has again reached level position the tail gate will be locked by moving the operating handle 39 in the reverse direction and relocking the latch member 43.

From the foregoing description, it will be apparent that there has been devised a highly efficient form of dump body which will be relatively simple to manufacture and quite inexpensive to produce.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention, what I claim as new and desire to secure by Letters Patent of the United States is:

1. In combination with a truck chassis, of a dump body pivotally supported thereon at a point nearer its rear end than to its forward end, longitudinally extending I-beams supported upon said chassis between the same and the mount for said dump body, a plurality of support members including a pair of converging rods positioned at the forward end of said dump body and depending therebelow, a bar secured at the ends of said plurality of members, a manually operated hoist secured to said beams and provided with a pedestal supported sheave, and a hoist cable secured to said hoist and extending over said sheave and connected with said bar whereby rotation of said hoist will elevate the forward end of said body, and when dumped gravity will cause said body to resume its normal position.

CLANS GUIDRY.

REFERENCES CITED

The following references are of record in the file of this patent:

UNITED STATES PATENTS

| Number | Name | Date |
| --- | --- | --- |
| 1,332,308 | Sanderson | Mar. 2, 1920 |
| 1,418,387 | Mayer | June 6, 1922 |